United States Patent
Sun et al.

(10) Patent No.: US 9,426,682 B2
(45) Date of Patent: Aug. 23, 2016

(54) METHOD AND APPARATUS FOR REDUCING RADIO INTERFERENCES

(75) Inventors: Pengfei Sun, Beijing (CN); Xinying Gao, Beijing (CN); Haiming Wang, Beijing (CN); Chunyan Gao, Beijing (CN)

(73) Assignee: Broadcom Corporation, Irvine, CA (US)

( * ) Notice: Subject to any disclaimer, the term of this patent is extended or adjusted under 35 U.S.C. 154(b) by 50 days.

(21) Appl. No.: 14/385,001

(22) PCT Filed: Mar. 13, 2012

(86) PCT No.: PCT/CN2012/072282
§ 371 (c)(1),
(2), (4) Date: Sep. 12, 2014

(87) PCT Pub. No.: WO2013/134930
PCT Pub. Date: Sep. 19, 2013

(65) Prior Publication Data
US 2015/0049624 A1  Feb. 19, 2015

(51) Int. Cl.
*H04W 24/08* (2009.01)
*H04W 72/08* (2009.01)
*H04L 5/14* (2006.01)
*H04W 8/18* (2009.01)

(52) U.S. Cl.
CPC ........... *H04W 24/08* (2013.01); *H04L 5/14* (2013.01); *H04W 72/082* (2013.01); *H04W 8/186* (2013.01); *Y02B 60/50* (2013.01)

(58) Field of Classification Search
CPC ... H04W 24/08; H04W 72/08; H04W 72/082; H04W 8/186; H04L 5/14; Y02B 60/50
USPC ........................................................ 370/252
See application file for complete search history.

(56) References Cited

U.S. PATENT DOCUMENTS

| 8,107,883 B2 | 1/2012 | Peng et al. |
| 8,219,092 B2 | 7/2012 | Oteri et al. |
| 2003/0054829 A1 | 3/2003 | Moisio |

(Continued)

FOREIGN PATENT DOCUMENTS

| CN | 102196510 | | 9/2011 | |
| JP | 02322045 | * | 11/1990 | |
| WO | WO2012/135978 A1 | * | 10/2012 | .......... H04W 28/048 |

*Primary Examiner* — Afsar M Qureshi
(74) *Attorney, Agent, or Firm* — Oblon, McClelland, Maier & Neustadt, L.L.P.

(57) ABSTRACT

The present application relates generally to use of radio resources in a radio access network (RAN) and, in more specific, Full-Duplex (FD) transmission on the same carrier. Due to the mobility of the UEs or the non-optimal grouping, two UEs belonging to different groups may be close to each other while performing transmission and cause serious transmission interferences to 5 each other. This is one of the problems which a method in accordance with the invention aims to solve. When the performing the method a RAN triggers a UE to measure 601 first interferences originated from a first group of UEs. Then the RAN triggers the same UE to measure 602 second interferences originated from a second group of the UEs. Finally, the RAN places 603 the UE into the first group, if the first interferences are higher than the second interferences. The both 10 groups of the UEs are composed of such user equipments which share a group-specific transmission pattern. Uplink and downlink resources of the RAN are scheduled according to a time-division to the UEs, so that simultaneous transmissions are allowed only for such user equipments that belong to different groups. Advantages of the invention are the following: 1) simultaneous transmission and reception is supported in a RAN and in a UE which is either a FD 15 UE or a HD UE, 2) different kinds of interferences are efficiently reduced, and 3) the interferences are measured in a way that saves power.

20 Claims, 6 Drawing Sheets

(56) References Cited

U.S. PATENT DOCUMENTS

| | | | |
|---|---|---|---|
| 2010/0034108 A1 | 2/2010 | Ode | |
| 2010/0240312 A1* | 9/2010 | Peng | H04W 72/02 455/63.1 |
| 2013/0070634 A1* | 3/2013 | Gao | H04W 24/10 370/252 |
| 2014/0056190 A1* | 2/2014 | Qian | H04W 28/048 370/280 |

* cited by examiner ved to be an unfeasible concept for mobile communications in practice because a transmission signal of a mobile phone 'leaks' into the receiver of the mobile phone. This is termed

METHOD AND APPARATUS FOR REDUCING RADIO INTERFERENCES

This Application is a national stage entry of PCT/CN2012/072282, filed on Mar. 13, 2012.

TECHNICAL FIELD

The present application relates generally to use of radio resources in a radio access network (RAN) and, in more specific, Full-Duplex (FD) transmission on the same carrier. Universal Mobile Telecommunication System (UMTS), Universal Terrestrial Radio Access Network (UTRAN), a Long Term Evolution (LTE) network called Evolved UTRAN (E-UTRAN), and an LTE advanced network are some examples of RANs.

BACKGROUND

Simultaneous transmission and reception on the same carrier, i.e. the FD transmission on the same carrier, has been known to be possible in theory, but it has been earlier deemed to be an unfeasible concept for mobile communications in practice because a transmission signal of a mobile phone 'leaks' into the receiver of the mobile phone. This is termed self-interference. The self-interference is difficult to remove in practice. However, some researchers in Standford University and Rice University have recently developed a practical full duplex system by using combined and advanced self-interference cancellation schemes. The FD transmission can easily double data throughput in a wireless communications system and if the FD transmission is cleverly implemented on Medium Access Control (MAC) layer of the wireless communications system, the data throughput may be even higher.

In current wireless networks, such as an LTE network, communications is based on Half-Duplex (HD) transmission. Thus, simultaneous data transmission and reception using the same time slot and frequency is not allowed. Even if base stations of the LTE network, i.e. eNBs, are capable of FD, the most UEs are likely HD devises and thus incapable for full dublex transmissions. One known solution to utilize the FD capability in an eNB of the network is as follows. The eNB or base station (BS) defines two UE groups: "UE group #1" and "UE group #2" so that UL/DL subframes of different groups are not overlapped, wherein the UL subframes are included in one group's frame where the DL subframes are included in the other group. When the eNB detects an UE, it places the UE into one of the two groups. By doing this, each Half-Dublex (HD) UE will operate as a normal Time Division Dublex (TDD) UE and the full duplex transmission is realized in the eNB side only.

FIG. 1 illustrates non-overlapping UL/DL subframes of different UE groups. There are two UE groups, Group #1 and Group #2, and the both UE groups include one or more UEs. The eNB has allocated seven subframes 101-107 to Group #01 and seven subframes 108-114 to Group #02. When time passes, the UEs of Group #1 uses the subframes 101-107 from left to right, and simultaneously the UEs of Group #2 uses the subframes 108-114. Each subframe 101-114 includes a letter disclosing to which type of use each subframe is intended for. The letter U means an uplink transmission, the letter D means a downlink transmission, and the letter S means "special frame". As can be seen in the figure, in the all simultaneous pairs of subframes (101 & 103, 102 & 104, etc.) the uplink transmissions are non-overlapping in time and also the downlink transmissions are non-overlapping.

The solution of FIG. 1 works fine, if the UEs are placed in appropriate way into groups and the UEs stay where they are. In practice, when the UEs are mobile devices at least some UEs move. Two UEs belonging to different groups may come close to each other, because at least one of them has moved and the distance between them is shortened. Sometimes the UEs are originally placed into the groups so that the distance between them is too short, i.e. the grouping is non-optimal. Due to the mobility of the UEs or the non-optimal grouping, two UEs belonging to different groups may be close to each other while performing transmission and cause serious transmission interferences to each other. This is one of the problems which the present invention aims to solve.

SUMMARY

Advantages of the invention can be considered to be the following: 1) simultaneous transmission and reception is supported in a RAN with a UE which is either a FD UE or a HD UE, 2) different kinds of interferences are efficiently reduced, and 3) the interferences are measured in a way that saves power at the UE that performs the measurements.

In one aspect of the present invention, a method of reducing radio interferences comprises the following to be performed in a radio access network:
    triggering a user equipment to measure first interferences originated from a first group of user equipments;
    triggering the user equipment to measure second interferences originated from a second group of the user equipments, wherein uplink and downlink resources of the radio access network are scheduled according to a time-division, so that simultaneous transmissions are allowed only for such user equipments that belong to different groups; and
    placing the user equipment into the first group when the first interferences are higher than the second interferences.

The method of reducing radio interferences has a number of embodiments.

In one embodiment the first interferences are measured using a first measurement pattern and the second interferences are measured using a second measurement pattern.

In one embodiment first measurement pattern results in at least one measuring result due to which the first interferences are higher than the second interferences.

In one embodiment the method comprises the following to be performed in the radio access network:
    setting into the first measurement pattern a measurement period that at least partly overlaps of a transmission period scheduled to the first group.

In one embodiment the method comprises the following to be performed at a radio access network:
    making a transmission pattern for a Full-Duplex user equipment, the transmission pattern allocating a part of the uplink and downlink resources to the Full-Duplex user equipment.

In one embodiment the transmission pattern discloses a time period that is intended for Full-Duplex transmission and another time period that is intended for Half-Duplex transmission in either uplink or downlink direction.

In one embodiment the method comprises the following to be performed at a radio access network:
    triggering the user equipment to measure third interferences originated from the second group of user equipments.

In one embodiment the method comprises the following to be performed in a radio access network:
preventing, during at least one time period, simultaneous transmissions of two such user equipments that belong to the different groups when a measuring report is obtained as a response to the triggering and the measuring report indicates high interference.

In one embodiment the method comprises the following to be performed at a radio access network:
creating an interference relationship table on the basis of the measuring report to detect high interferences.

In one embodiment the third interferences are at least partly caused by the Full-Duplex user equipment.

In one embodiment the method comprises the following to be performed in a radio access network:
moving the user equipment from the first group into the second group when the third interferences are higher than the first interferences.

In one embodiment at least the step of placing the user equipment into the first group is performed at a base station of the radio access network when the user equipment is located on a coverage area of the base station.

In one aspect of the present invention, an apparatus comprising at least one processor; and at least one memory including computer program code, the at least one memory and the computer program code configured to, with the at least one processor, cause the apparatus to perform at a user equipment at least the following:
measuring first interferences originated from a first group of user equipments and
measuring second interferences originated from a second group of the user equipments, wherein uplink and downlink resources of a radio access network are scheduled according to a time-division, so that simultaneous transmissions are allowed only for such user equipments that belong to different groups; and
reporting the first interferences and the second interferences.

The apparatus can be termed a "measuring apparatus" and it has a number of embodiments.

In one embodiment the first interferences are measured using a first measurement pattern and the second interferences are measured using a second measurement pattern.

In one embodiment the first measurement pattern results in at least one measuring result due to which the first interferences are higher than the second interferences.

In one embodiment the apparatus is caused to perform in the user equipment:
reading from the first measurement pattern a measurement period that at least partly overlaps of a transmission period scheduled to the first group.

In one embodiment the apparatus is caused to perform in the user equipment:
interrupting the measuring of the first interferences when the measurement period ends.

In one embodiment the apparatus is caused to perform in the user equipment:
continuing the measuring during a next measurement period when the first measurement pattern includes the next measurement period.

In one embodiment the reporting includes adding first measurement results describing the first interferences and adding second measurement results describing the second interferences into a measurement report to be sent to the radio access network.

In one embodiment an interference included in the first interferences is measured as power of unwanted signal.

In one embodiment a measurement result of the interference is a bitmap.

In one aspect of the present invention, an apparatus comprising at least one processor; and at least one memory including computer program code, the at least one memory and the computer program code configured to, with the at least one processor, cause the apparatus to perform in a radio access network at least the following:
triggering a user equipment to measure first interferences originated from a first group of user equipments;
triggering the user equipment to measure second interferences originated from a second group of the user equipments, wherein uplink and downlink resources of the radio access network are scheduled according to a time-division, so that simultaneous transmissions are allowed only for such user equipments that belong to different groups; and
placing the user equipment into the first group when the first interferences are higher than the second interferences.

The apparatus can be termed an "apparatus for placing UEs into groups" and it has a number of embodiments.

In one embodiment the first interferences are measured using a first measurement pattern and the second interferences are measured using a second measurement pattern.

In one embodiment the first measurement pattern results in at least one measuring result due to which the first interferences are higher than the second interferences.

In one embodiment the apparatus is caused to perform:
setting into the first measurement pattern a measurement period that at least partly overlaps of a transmission period scheduled to the first group.

In one embodiment the apparatus is caused to perform:
making a transmission pattern for a Full-Duplex user equipment, the transmission pattern allocating a part of the uplink and downlink resources to the Full-Duplex user equipment.

In one embodiment the transmission pattern discloses a time period that is intented for Full-Duplex transmission and another time period that is intended for Half-Duplex transmission in either uplink or downlink direction.

In one embodiment the apparatus is caused to perform:
triggering the user equipment to measure third interferences originated from the second group of user equipments.

In one embodiment the apparatus is caused to perform:
preventing, during at least one time period, simultaneous transmissions of two such user equipments that belong to the different groups when a measuring report is obtained as a response to the triggering and the measuring report indicates high interference.

In one embodiment the apparatus is caused to perform:
creating an interference relationship table on the basis of the measuring report to detect high interferences.

In one embodiment the third interferences are at least partly caused by the Full-Duplex user equipment.

In one embodiment the apparatus is caused to perform:
moving the user equipment from the first group into the second group when the third interferences are higher than the first interferences.

In one embodiment at least the step of placing the user equipment into the first group is performed at a base station of the radio access network when the user equipment is located on a coverage area of the base station.

In one aspect of the present invention, a computer readable medium comprises a set of instructions, which, when executed on an apparatus capable to operate in a radio access network causes the apparatus to perform the steps of.

triggering a user equipment to measure first interferences originated from a first group of user equipments;

triggering the user equipment to measure second interferences originated from a second group of the user equipments, wherein uplink and downlink resources of the radio access network are scheduled according to a time-division, so that simultaneous transmissions are allowed only for such user equipments that belong to different groups; and placing the user equipment into the first group when the first interferences are higher than the second interferences.

In one aspect of the present invention, a computer readable medium comprising a set of instructions, which, when executed on an apparatus capable to operate in a user equipment causes the apparatus to perform the steps of.

measuring first interferences originated from a first group of user equipments and measuring second interferences originated from a second group of the user equipments, wherein uplink and downlink resources of a radio access network are scheduled according to a time-division, so that simultaneous transmissions are allowed only for such user equipments that belong to different groups; and reporting the first interferences and the second interferences.

BRIEF DESCRIPTION OF THE DRAWINGS

For a more complete understanding of examples and embodiments of the present invention, reference is now made to the following descriptions taken in connection with the accompanying drawings in which.

DETAILED DESCRIPTION OF THE INVENTION

Figure 1:
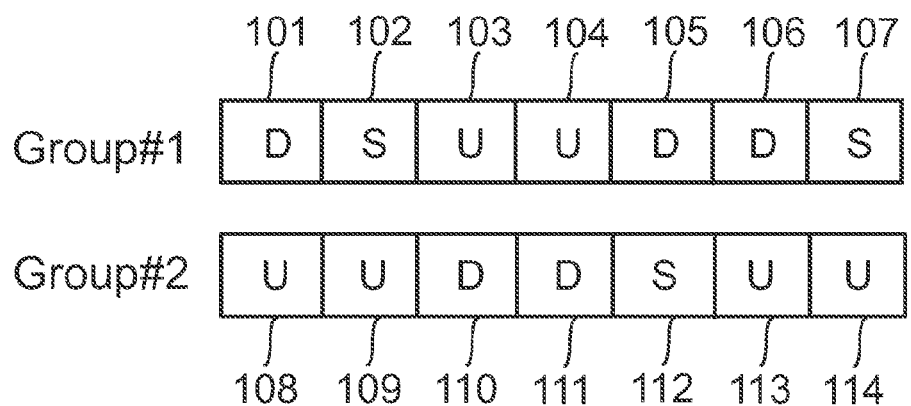
FIG. 1 shows two group-specific transmission patterns with non-overlapping UL/DL subframes of different UE groups.

As described in the above, serious transmission interferences will happen when the UEs belonging to different UE groups move close to each other. It is obvious that the RAN should control its resources and reduce radio interferences. This reducing of the radio interferences includes eliminating the serious transmission interferences, when possible. The reducing of the radio interferences concerns interferences which the UE causes as well as interferences which other UEs cause. These other UEs may belong to a same group than the UE or they may belong to another group. Radio interferences can be measured in many ways. A signal, which the UE has received across the spectrum, is usually composed of three parts. The parts are: 1) wanted signal from an expected source, 2) unwanted signal emitted from some other source than the expected source, and 3) background noise. The part 2) is generally understood as interference. One simple and feasible way to measure the interference is to measure the power of the unwanted signal. The eNB, on whose cell the UEs are currently located, controls the RAN resources. Therefore, in one embodiment, the eNB performs steps of the method in accordance with the invention, though at least some of the steps could be performed in somewhere else. The method comprises two phases.

In the first phase of the method the eNB determines each UE's group so that the UEs locating geographilly close to each other are placed in the same UE group. In other words, the UEs belonging to the same UE group define a site. In addition, eNB may move an UE from its current UE group to another UE group, if this moving is assumed to reduce interferences. The first phase of the method is termed a "grouping phase".

In the second phase of the method the eNB uses certain UL/DL scheduling to avoid interferences. The interferences are probable to happen when the first step cannot be performed so that the sites are fully separated. Thus, there may be UEs which locate close to each other though they belong to different UE groups. In the second phase the eNB avoids letting two UEs which locate close to each other but belong to different groups use the same subframe. In this way serious interference is usually avoided. The number of interferences increases, if many users of UEs try to simultaneously send or transmit large data amounts on a relative small geograghical area. The second phase of the method is termed a "scheduling phase".

In the following such UE, which is capable to Full-Duplex (FD) transmission, is termed an FD UE. Correspondingly, a UE which is capable to Half-Duplex (HD) transmission is termed an HD UE. A FD UE is capable of simultaneous transmission and reception in the same carrier. A HD UE is capable only transmission or reception in the same carrier at a time. The FD UE is capable to transmit data, as well as receive data, at any subframe. If the FD UE has not simultaneous UL transmission and DL transmission, it does not need its FD capability at that moment. Therefore, at a given subframe, the FD UE may have one of three transmissions: UL transmission, DL transmission, or FD transmission.

The both method phases, the grouping phase and the scheduling phase, include many technical details. Before the detailed description of the method, certain background information is provided.

The present application focus on a TDD group-based FD system which involves an eNB capable of FD, and FD UEs as well as HD UEs. The invention is based on interference measurements at UEs and measurement reports sent by the UEs. The interference measurements at UEs result in the measurement reports which provide information for grouping the HD UEs and for making a scheduling schema for HD UEs. The eNB starts the making of the schema from HD UEs to avoid interferences and to enable high utilization rate of transmission resources. The scheduling schema, which determines if a certain HD UE is allowed to perform transmission/reception in a certain subframe, is made to avoid inter-group interference as good as possible. The inter-group interference is such radio interference that is caused by UEs belonging to different groups but scheduled with transmission and reception in the same subframe simultaneously.

As for FD UEs, no grouping restriction is existed. FD UEs could perform transmission or reception or both at any subframe. This feature results in a user-specific transmission pattern for FD UEs.

Figure 2A:
FIG. 2A shows a user-specific transmission pattern.

FIG. 2A shows a user-specific transmission pattern 201 by which the eNB controls the behavior of a FD UE. The FD UE is marked with UE#A. In this example the transmission pattern is composed of six letters, one value per subframe. As in the above, the letter U means UL transmission and the letter D means DL transmission. A pair of letters, FD, means FD transmission. The transmission pattern 201 discloses that in the first subframe 202 UE#A is allowed to have DL transmission, and in the sixth subframe 203 UE#A is allowed to have again DL transmission.

Figure 2B:
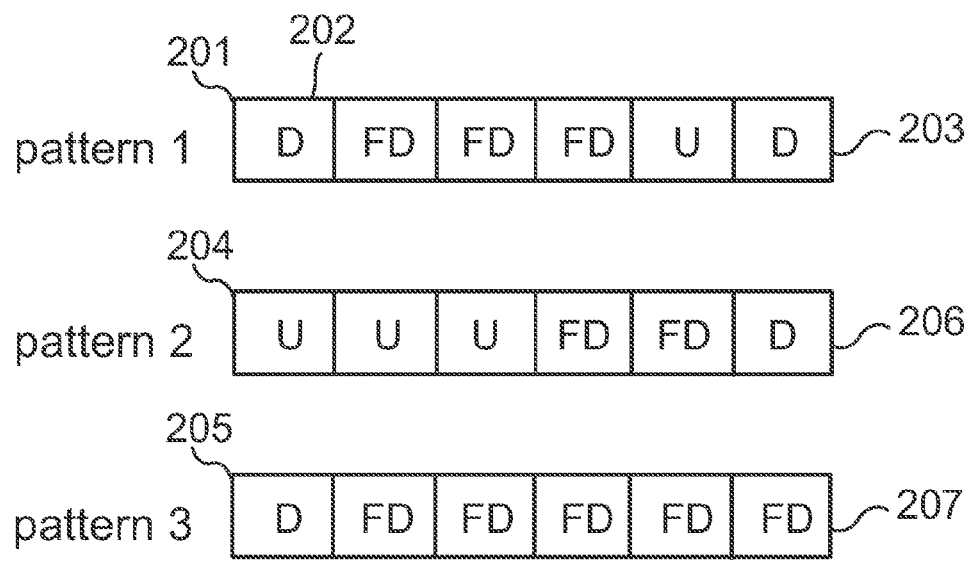
FIG. 2B shows three user-specific transmission patterns for three FD UEs.

FIG. 2B shows three transmission patterns 201, 204, and 205 for three FD UEs which are UE#A, UE#B, and UE#C. In this example UE#A is allowed to have DL transmission in the sixth subframe 203, UE#B is allowed to have DL transmission in the sixth subframe 206, and UE#C is allowed to have FD transmission in the sixth subframe 207.

The method in accordance with the invention involves the following assumptions. An eNB is capable of FD, i.e. simultaneous transmission and reception in the same carrier. Each UE is either a FD UE or a HD UE and coexistence of FD UEs and HD UEs is possible. Each HD UE is operating in a "LTE TDD" mode. A FD UE knows, which signaling is to be expected from the eNB side, because the FD UE has a UE-specific transmission pattern, such as a pattern shown in FIG. 2A. The HD UE knows which signaling is to be expected from the eNB side, because it has a group-specific transmission pattern available. HD UEs belonging to a same group have the same group-specific transmission pattern. The third type of pattern is a measurement pattern. Each measurement pattern is UE-specific.

Grouping Phase.

This first phase of the method comprises two subphases: an interference measuring subphase and a group selection subphase. The basic idea is that first, a HD UE measures interferences and then the eNB selects a group for the HD UE. The HD UE is not allowed to have a transmission beforea group is selected for it. The grouping phase proceeds as follows. The eNB triggers a HD UE to perform the interference measurements, using certain measurement patterns, and to send the measurement report to the eNB. Then the eNB determines, on the basis of the measurement report, a group for this HD UE. In more detail, the eNB triggers the interference measurement via DL signaling. The DL signaling contains the measurement patterns to be used in the interference measurements. Each measurement pattern specifies, for example, which subframes should be measured, which filter should be used, which reference signal should be used, and so on. The eNB is able to detect different kinds of interferences based on the reports, for example, interference from a group, interference from a certain UE, etc. The use of the measurement pattern reduces the power consumption of the UE, because the measurement pattern orders the UE to measure interference only during those subframes when the measuring is necessary. Then, based on the measurement report, the eNB selects a group for the UE and informs, by DL signaling, into which group the eNB has placed the UE. Assuming that there are two groups of UEs, Group#1 and Group#2, the eNB uses the following decision criteria when it selects a group for UE#A:

1) if UE#A reports higher interference from Group#2 than that of Group#1, UE#A is closer to Group#1 and thus the eNB selects Group#2 for UE#A;

2) if UE#A reports higher interference from Group#1 than that of Group#2, UE#A is closer to Group#1 and thus the eNB selects Group#1 for UE#A.

The decision criteria may be at first difficult to understand, but it should be noticed that within each group interferences are basically avoided by using a time division. Thus, if interferences exist, they are probably originated from the neighboring groups.

The grouping phase of the method is visualized in the following exemplary implementation. The measurement report is assumed to include at least one bitmap of three bits. A bitmap discloses the interference level so that the value 111 represents the highest possible interference and the value 000 represent the lowest possible interference. The eNB is in responsible for scheduling the transmission resources of the RAN and because of its scheduling information, the eNB has capability to trigger comprehensive interference measurements at the UEs and order them to send the measurement reports to the eNB. In the other words, the eNB is able to obtain the all information that is needed for group selections.

Figure 3:
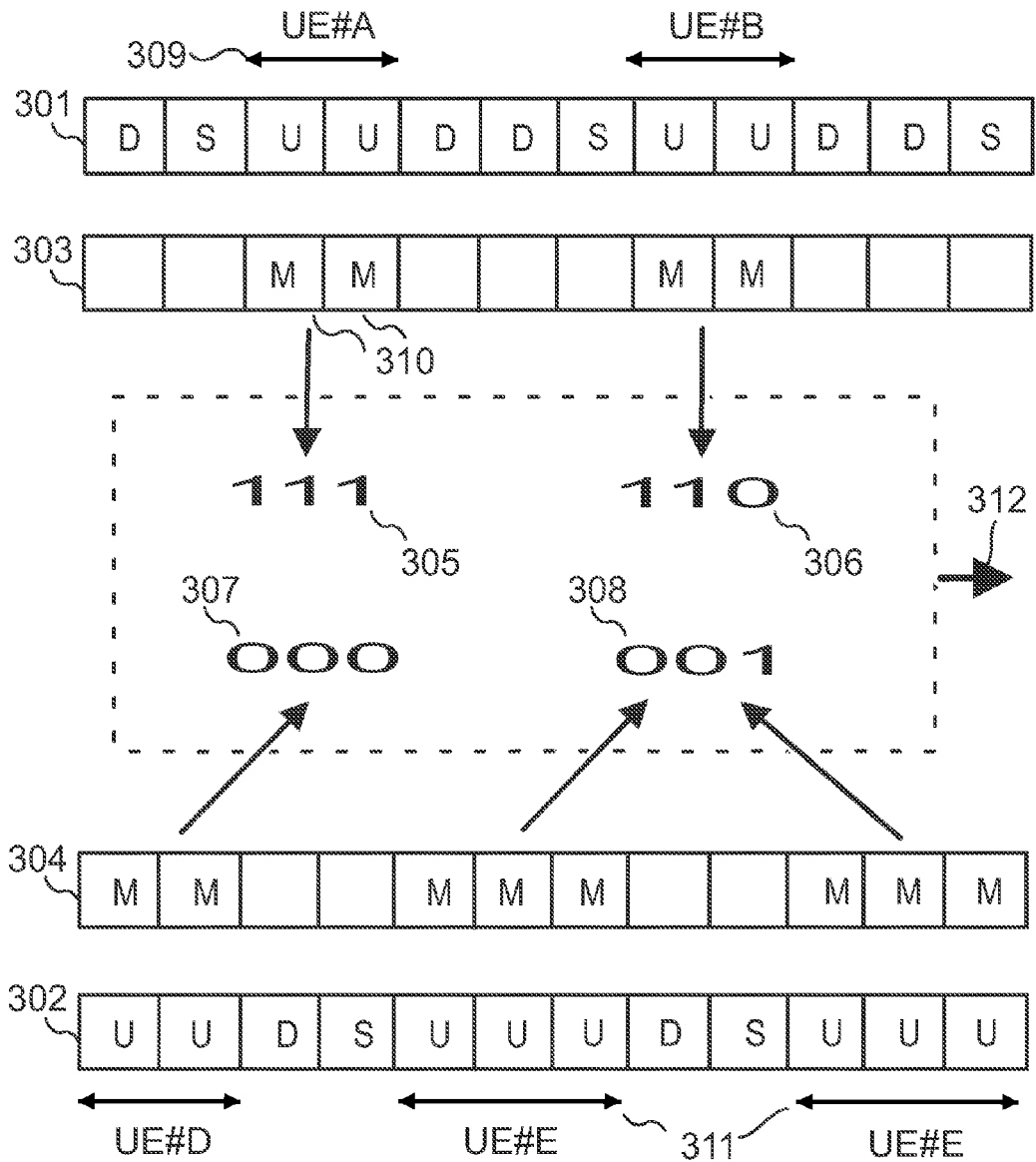
FIG. 3 illustrates the grouping phase of the method.

FIG. 3 illustrates the grouping phase of the method. There are altogether five HD UEs of which UE#A and UE#B belong to Group#1, UE#D and UE#E belong to Group#2, and UE#C is yet without a group. The eNB performs the group selection for UE#C as follows. The eNB has available a group-specific transmission pattern 301 of Group#1 and a group-specific transmission pattern 302 of Group#2. Thus, the eNB knows when the UEs in Group#1 and Group#2 are going to have transmissions. On the basis of this information the eNB makes two measurement patterns for UE#C. The first measurement pattern 303 is intended for measuring interference in Group#1 and the second measurement pattern 304 is intended for measuring interference in Group#2. The eNB triggers the UE#C to perform interference measurements using the both patterns 303 and 304. The interference measurements results in four bitmaps 305-308 so that the bitmap 305 is a measurement result between UE#C and UE#A, the bitmap 306 is a measurement result between UE#C and UE#B, the bitmap 307 is a measurement result between UE#C and UE#D, the bitmap 308 is a measurement result between UE#C and UE#E. The measurements are done based on listening to other UEs' UL transmission. Different number of UL subframes are scheduled for UEs. For example, the eNB has scheduled two UL subframes for UE#A , thus the transmission period 309 of UE#A is assumed to be two subframes. The eNB has made the measurement pattern 303 so that it includes a measurement period to measure possible interferences during the transmission period 309. This measurement period is composed of two subframes 310. Generally speaking, a measurement pattern includes at least one measurement period which is composed of at least one subframe. In addition to the transmission period 309, the group-specific transmission pattern 301 includes a transmission period for UE#B as shown in FIG. 3. A UE may have more than one transmission periods. For example, UE#E has two transmission periods 311, each composed of three subframes. When the measurements are done, the UE#C adds the bitmaps 305-308 into its measurement report and sends 312 the measurement report to the eNB. As the bitmaps 306 and 306 disclose, the interference level was 111 and 110 in Group#1, and as the bitmaps 307 and 308 disclose, the interference level was 000 and 001 in Group#2. Therefore, the eNB determines the interference level to be higher in Group#1 and lower in Group#2. The eNB also determines that UE#C will suffer less interference, and on the other hand, introduce less interference, if UE#C is placed into Group#1. Then the eNB signals to the UE#C to select Group#1 as its operating group. In addition, the eNB avoids to schedule the transmission resources to UE#C and to UE#E in same subframes, because the simultaneous transmissions of UE#C and UE#E would cause more interferences than that with UE#D.

Conversely, as HD UEs, a FD UE has a UE-specific transmission pattern. Similar to the HD UEs, the FD UE is subject to interferences and its UE-specific transmission pattern should be selected as carefully as the HD UEs' groups. The procedure is basically similar to that illustrated in FIG. 3. The eNB makes special measurement patterns for the FD UE. Then the eNB triggers the FD UE to perform the measurements that evaluates interference to groups or UEs. After the measurements the FD UE sends its measurement report to the eNB, and the eNB determines on the basis of the report which transmission pattern the FD UE should use.

As mentioned in the above, the eNB makes three different types of patterns: group-specific transmission patterns, UE-specific transmission patterns, and measurement patterns. The eNB sends the patterns to UEs using DL signaling. For example, the eNB sends a pattern on Physical Downlink Control Channel (PDCCH) and the UE receives the pattern, for example, by using blind detection. When the UE has measured interferences, its sends the measurement report, for example, on Physical Uplink Control Channel (PUCCH) to the eNB. The PDCCH and PUCCH are control channels and, in addition, there are data channels, such as Physical Downlink Shared Channel (PDSCH) and Physical Uplink Shared Channel (PUSCH). Generally speaking, the RAN provides uplink resources and downlink resources for different types of communications. Espesially, subframes of PUSCH are these uplink resources and subframes of PDSCH are these downlink resources. Use of PUSCH and/or PDSCH may cause interferences. When the UE measures interferences and the RAN is a LTE network, the UE measures PUSCH. Radio interferences may cause that a transmission more or less fails, i.e. packets are lost. If the transmission of a group-specific transmission pattern, a UE-specific transmission pattern, or a measurement pattern fails, or if the transmission of data fails in the uplink direction or in the downlink direction, the known HARQ procedure can be used for retransmission of the lost packets.

Figure 4:
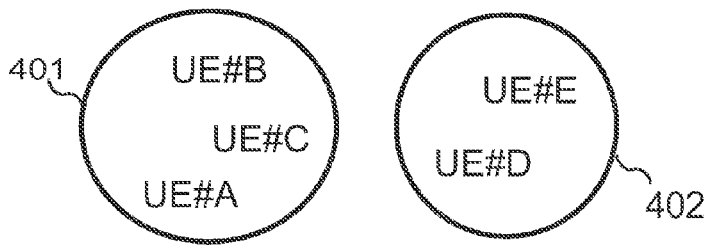
FIG. 4 shows two UE groups resulted in the grouping phase.

FIG. 4 shows two UE-groups. The first phase of the method ends when the all HD UEs are grouped and each FD UEs has got its UE-specific transmission pattern from the eNB. In this example, UE#C was placed into Group#1 401, thus now Group#1 401 includes UE#A, UE#B, and UE#C, and Group#2 402 includes UE#D and UE#E.

Scheduling Phase. The second phase of the method concerns both the HD UEs and the FD UEs. The eNB aims to schedule the transmission of each UE so that they interfer each other as less as possible. As in the first phase, the eNB triggers the HD UEs to measure interference and send measurement reports to it. One difference to the first phase is that in the eNB creates an interference relationship table. The eNB detects from the interference relationship table whether serious interferences are supposed to appear between a specific pair of UEs. In the other words, the NB detects in advance the serious interferences from the interference relationship table and can usually avoid them by scheduling the UEs' UL/DL/FD transmission in an appropriate way.

Figure 5:
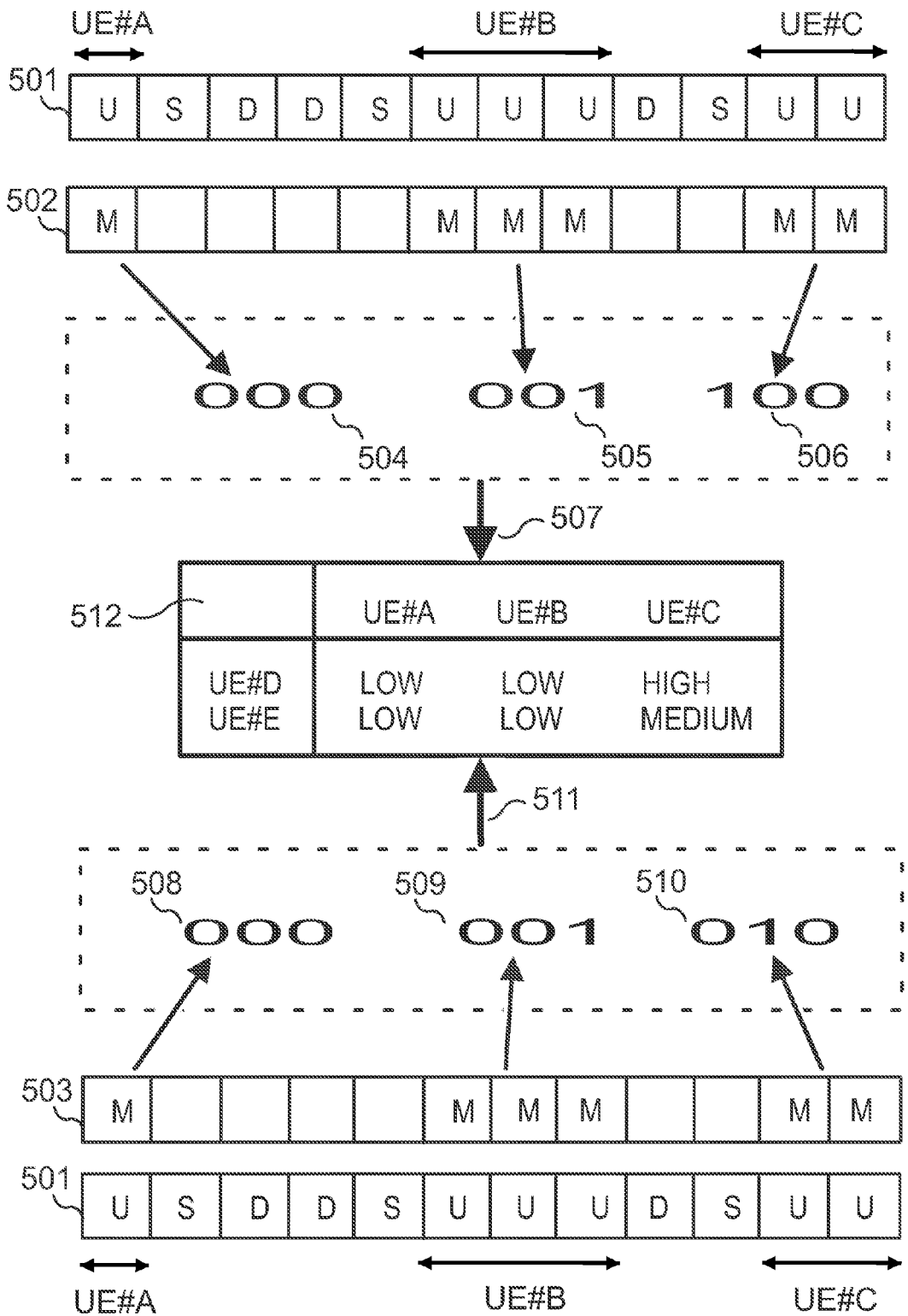
FIG. 5 illustrates the scheduling phase of the method.

FIG. 5 illustrates the scheduling phase of the method. There are the same two HD UE groups, Group#1 and Group#2, as in FIG. 4. The eNB makes a group-specific transmission pattern 501 for Group#1. The group-specific transmission pattern 501 includes a transmission period for each three UEs of Group#1, as shown in FIG. 5. In addition, the eNB mades measurement patterns for each UE of Group#2, i.e. for UE#D and UE#E. The eNB triggers UE#D to perform interference measurements with the measurement pattern 502 and UE#E to perform interference measurements with the measurement pattern 503. The both measurement patterns 502 and 503 include a measurement period for each transmission period of the group-specific transmission pattern 501. As in FIG. 3, the measurements concern UL transmissions only. UE#D and UE#E measure simultaneously the interferences. The measurements result in at UE#D bitmaps 504-506, which UE#D adds into its measurement report 507 and sends the measurement report to the eNB. Correspondingly, the measurements result in at UE#E bitmaps 508-510, which UE#D adds into its measurement report 511 and sends the measurement report to the eNB. The eNB receives the measurement reports 507 and 511 and creates an interference table 512 on the basis of them. In more details, the eNB interprets the bitmaps 504-506 included in the measurement report 507 as follows. The bitmaps 504 and 505 disclose the interference levels 000 and 001 which the eNB interprets to indicate low interference. The bitmap 506 discloses the interference level 100 which the eNB interprets to indicate high interference. Therefore, the eNB writes the values "LOW", "LOW", "HIGH" into the interference table 512, on the line starting with the label "UE#D". Correspondingly, the eNB interprets the bitmaps 508-510 included in the measurement report 511. The bitmap 510 discloses the interference level 010 which the eNB interprets to indicate medium interference. The eNB interprets the bitmaps 508-510 and writes the values "LOW", "LOW", "MEDIUM" into the interference table 512, on the line starting with the label "UE#E". Because Group#2 includes only two UEs, the interference table 512 is now ready. Then the eNB uses the interference table 512 to detect serious interferences. In this example, a certain cell of the interference table 512 includes the value "HIGH" which means serious interference. The eNB determines, on the basis of this certain cell, that simultaneous transmissions of UE#C and UE must be avoided.

It should be notice that the scheduling phase of the method also concerns FD UEs, though the all UEs in FIG. 5 are HD UEs. The procedure described in the above is similar to the FD UEs. The flexible transmission pattern enables a FD UE to select any one of the UL, DL or FD pattern for each subframe if only one transmission of the FD UE is taken into account. However, due to the possible interference, the flexible transmission pattern also needs careful schedule to avoid such interference. Thus, the aforementioned measurement and interference relationship table provides such scheduling capability.

Figure 6:
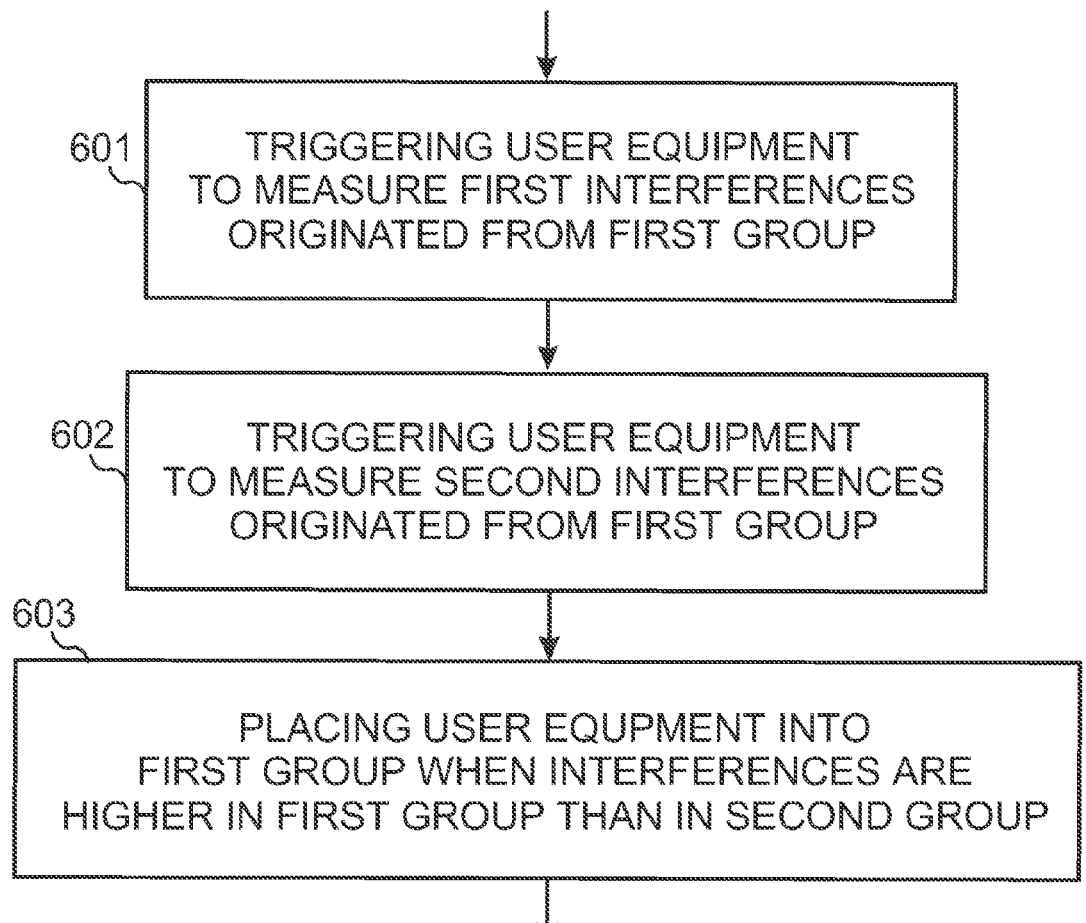
FIG. 6 illustrates the method in accordance with the invention.

FIG. 6 illustrates the method in accordance with the invention. The method is performed in a RAN and it aims to reduce radio interferences. The RAN triggers a UE to measure 601 first interferences originated from a first group of UEs. Then the RAN triggers the same UE to measure 602 second interferences originated from a second group of the UEs. Finally, the RAN places 603 the UE into the first group when the first interferences are higher than the second interferences. The both groups of the UEs are composed of such user equipments which share a group-specific transmission pattern. Uplink and downlink resources of the RAN are scheduled according to a time-division to the UEs, so that simultaneous transmissions are allowed only for such user equipments that belong to different groups. In other words, simultaneous transmissions are eliminated for such user equipments that belong to a same group. In practice, the user equipments belonging to the same group uses the same group-specific transmission pattern which eliminates simultaneous transmissions within the group. Simultaneous transmissions are allowed between groups, for example, between the first and the second group. In one embodiment of the method these simultaneous transmissions of different groups are implemented so that overlapping UL subframes and overlapping DL subframes are avoided, as illustrated in FIG. 1. The time-division which the RAN uses is, for example, TDD.

The interference measurements are performed using measuring instructions. For example, the measurement patterns illustrated in FIGS. 3 and 5 are used as the measuring instructions. They save the power of the UE, because they specify during which subframes interferences are measured. The first measurement pattern results in at least one measuring result due to which the first interferences are higher than the second interferences. In FIG. 3 the highest bitset value 111 is an example of such measuring result. Alternatively, the first interferences are higher than the second interferences when the average of the measuring results, which are related to the first group, is higher than the average of the measuring results, which are related to the first group.

When performing the method the RAN sets into the first measurement pattern a measurement period that at least partly overlaps of a transmission period scheduled to the first group. The transmission may last a number of subframes, but only some of them need to examined. FIGS. 3 and 5 shows examples of measurement periods that at least partly overlaps of transmission periods.

In the first phase of the method the RAN makes a transmission pattern for a FD UE, the transmission pattern allocating a part of the uplink and downlink resources to the FD UE. The transmission pattern discloses a time period that is intended for FD transmission and another time period that is intended for HD transmission in either uplink or downlink direction. These details of the method have been illustrated in the above in FIGS. 2A and 2B.

When the RAN has performed the three steps of the method which are shown in FIG. 6 the RAN waits, in one embodiment of the method, are a predefined time period and triggers the user equipment to measure third interferences originated from the second group of the UEs. Then the measures are performed using a third measurement pattern. During the predefined time period one or more UEs may have moved, due to which some interferences are substantially higher than before and some other interferences are substantially lower than before. When the RAN detects high interference, it prevents, during at least one time period, simultaneous transmissions of two such user equipments that belong to the different groups. The length of a time period is at least one subframe. In practice, the RAN prevents the high interference when it obtains a measuring report from the UE and the measuring report indicates high interference.

The RAN may create an interference relationship table on the basis of one measuring report, i.e. it possible that the interference relationship table contains only one line. In FIG. 5 the interference relationship table contains two lines: one line for UE#D and another line for UE#E. Basically, each measuring report results in one line to the interference relationship table. In one embodiment of the invention, the RAN moves, on the basis of a single measuring report or on the basis of the interference table, moves the user equipment from the first group into the second group when the third interferences are higher than the first interferences. In other words, though the UE was placed into the first group it can be later moved later into the second group. In one embodiment of the method the RAN triggers the user equipment to measure fourth interferences originated from the first group of UEs. Then the RAN obtains the measurement reports for the both groups. The situation is almost the same as in FIG. 6, but in the second phase of the method the measurement reports concern also the interferences originated from FD UEs, not only the interferences originated from HD UEs.

In FIG. 6 at least the step of placing the UE into the first group is performed at a base station of the RAN when the user equipment is located on a coverage area of the base station. If the RAN is an LTE network, the base station is termed an eNodeB or an eNB.

Figure 7:
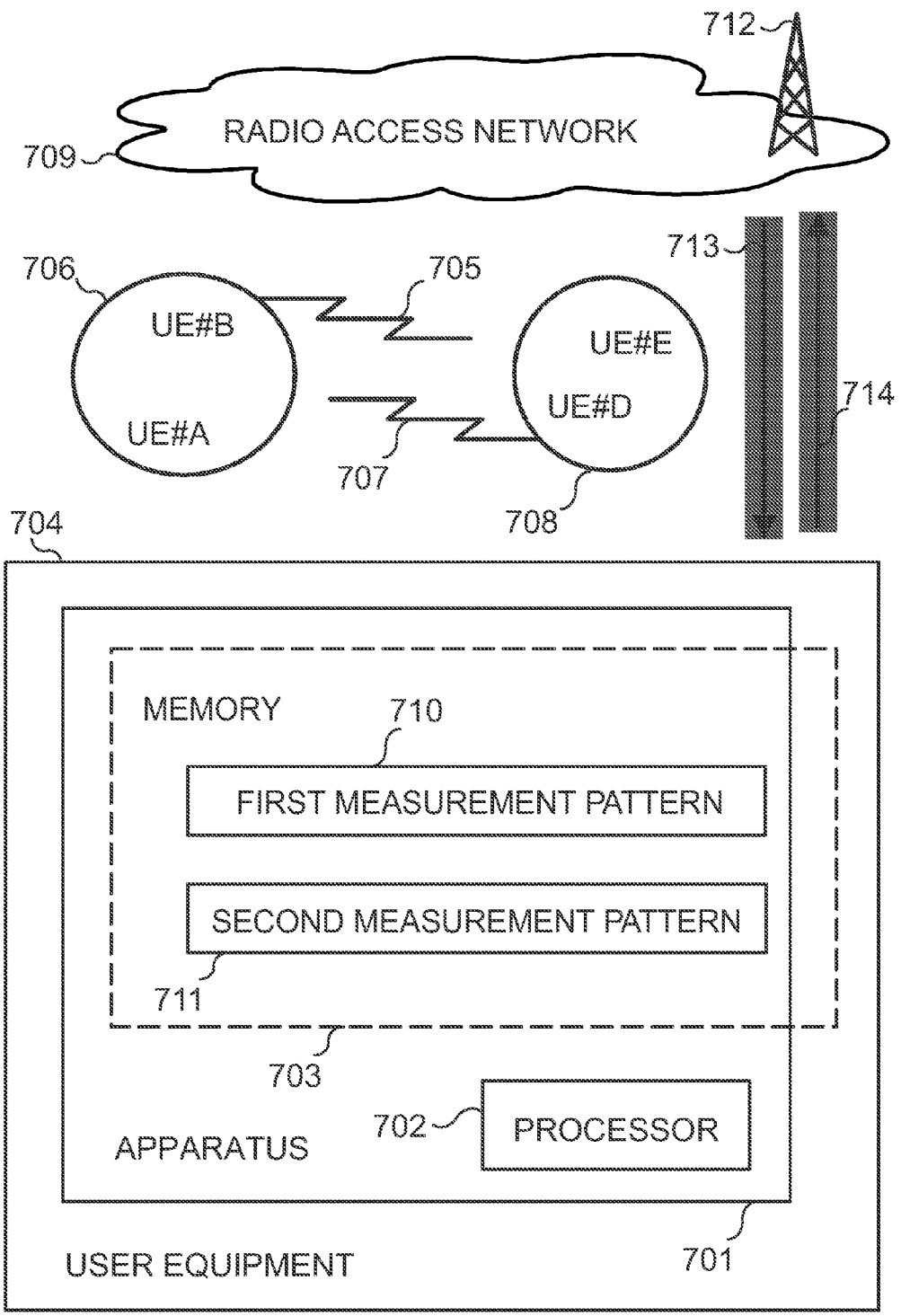
FIG. 7 illustrates the measuring apparatus.

FIG. 7 illustrates a measuring apparatus. The measuring apparatus 701 comprises at least one processor 702 and at least one memory 703 including computer program code. The apparatus 701 measures at UE 704 first interferences 705 originated from a first group 706 of UEs and the apparatus 701 measures second interferences 707 originated from a second group 708 of the UEs. The uplink and downlink resources of a RAN 709 are scheduled according to a time-division to the UEs, so that simultaneous transmissions are allowed only for such user equipments that belong to different groups. The apparatus 701 also reporting the first interferences 705 and the second interferences 707. The reporting may be an internal operation at the UE 704 or the apparatus 701 may report to the RAN 709.

In one embodiment of the apparatus 701 the first interferences 705 are measured using a first measurement pattern 710 and the second interferences 707 are measured using a second measurement pattern 711. The apparatus 701, or the UE 704, has received the patterns 710 and 711 from the RAN 709. When a base station 712 of the RAN 709 performs the method in accordance with the invention, the patterns 710 and 711 are sent from the base station 712. The first measurement pattern 710 results in at least one measuring result due to which the first interferences 705 are higher than the second interferences 707.

The patterns 710 and 711 may be transmitted on PDCCH 713 to the UE 704. The apparatus 701 adds the first measurement results describing the first interferences into its measuring report and the apparatus 701 adds the second measurement results describing the second interferences into a measurement report to be sent to the radio access network 709. The measuring report may be transmitted on PUCCH 714 to the base station 712.

When using the first measurement pattern 710 the apparatus 701 reads from the first measurement pattern a measurement period that at least partly overlaps of a transmission period scheduled to the first group 708 of the UEs. The measurement pattern 303 in FIG. 3 is an example of the first measurement pattern 710. In FIG. 3 the transmission pattern 301 includes two transmission periods, one for UE#A and another for UE#B, and the measurement pattern 303 includes two measurement periods that overlaps the transmission periods. Thus, FIG. 3 shows two examples of the measurement period that at least partly overlaps of the transmission period scheduled to the first group 708 of the UEs.

Apparatus 701 interrupts the measuring of the first interferences 707 when the measurement period ends. This feature of the apparatus 701 saves the power of the UE 704. In FIG. 3 the M letters included in the measurement pattern 303 illustrate time periods, i.e. subframes, during which the interferences are measured. When using FIG. 3 as an example, the apparatus 701 measures the interferences originated from UE#A. Then the apparatus 701 interrupts the measuring and the UE 704 may have a possibility to sleep. Apparatus 701 continues the measuring during a next measurement period when the first measurement pattern 710 includes the next measurement period. In FIG. 3 the measuring continues when UE#B have its transmission period as shown in the transmission pattern 301. When apparatus 701 measures interference related to a certain UE, a measurement result of the interference is, for example a bitmap. FIGS. 3 and 5 shows bitmaps, such as '000', '001', '011', '111' etc.

As mentioned in the above, interferences can measured in various ways. In one embodiment of the apparatus 701 an interference included in the first interferences 707 is measured as power of unwanted signal.

Figure 8:
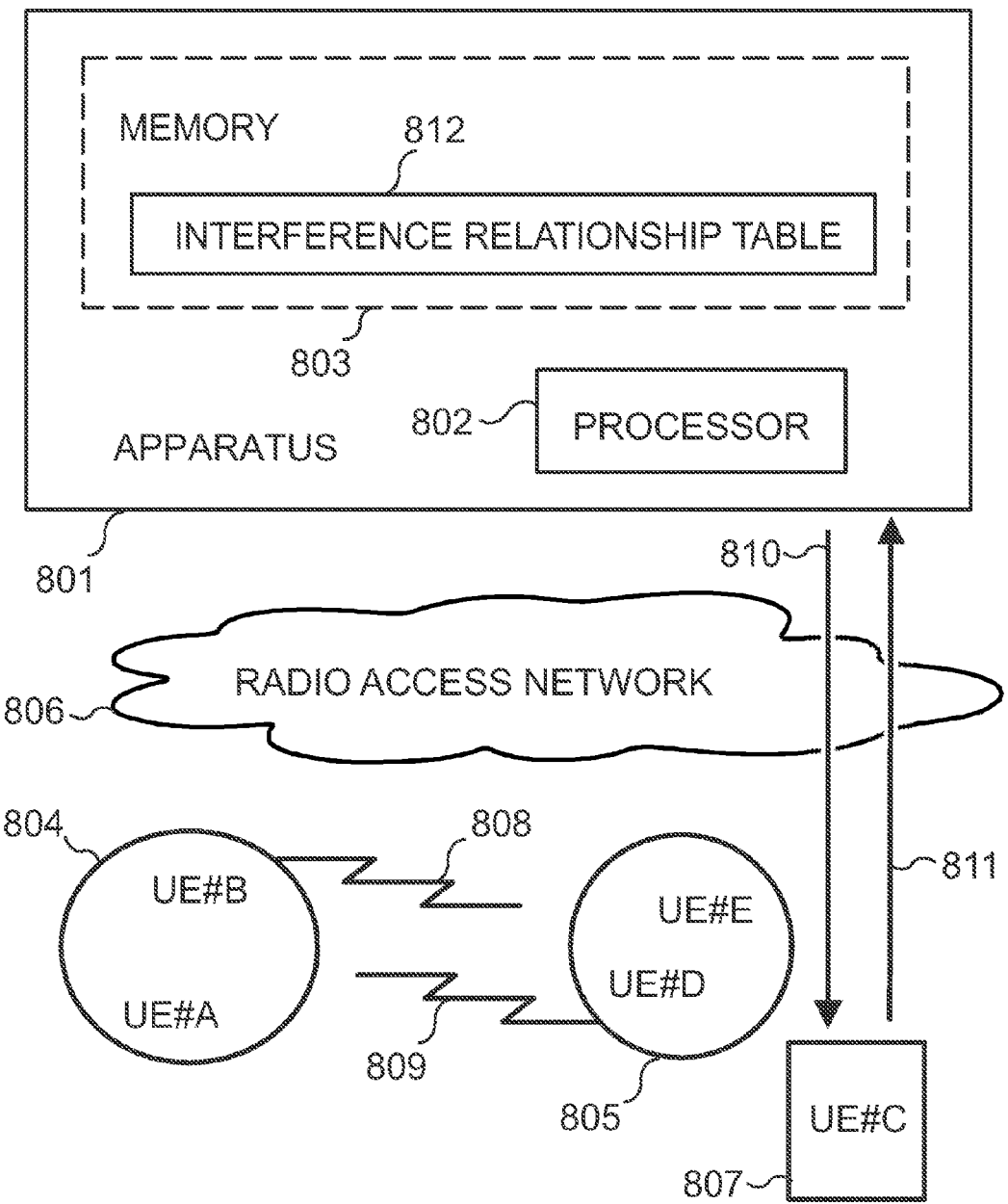
FIG. 8 illustrates the apparatus for placing UEs into groups.

FIG. 8 illustrates an apparatus 801 for placing UEs into groups. The apparatus 801 comprises at least one processor 802 and at least one memory 803 including computer program code. There are two groups of UEs, a first group 804 and a second group 805. Uplink and downlink resources of a RAN 806 are scheduled according to a time-division to the UEs. Many kinds of radio interferences are efficiently reduced when simultaneous transmissions are allowed only for such user equipments that belong to different groups (805, 806). The apparatus 801 aims to place the UEs into groups so that radio interferences in the RAN 806 are avoided as good as possible. The apparatus triggers UE#C 807 to measure first interferences 808 originated from a first group 804 of UEs. Then the apparatus triggers the same UE 807 to measure second interferences 809 originated from a second group 805 of the UEs. The apparatus 801 places the UE#C 807 into the first group 804, if the first interferences 808 are higher than the second interferences 809. The both groups, 804 and 805, are composed of such UEs which share a group-specific transmission pattern. For example in FIG. 3, UE#A and UE#B share a group-specific transmission pattern 301 and UE#D and UE#E share a group-specific transmission pattern 302. Triggering 810 of UE#C 807 is performed through the RAN 806 and the measurement report of UE#C 807 is received through the RAN 806. The apparatus 801 is configured to perform the steps of the method in accordance with the invention. In the second phase of the method the apparatus receives at least one measurement report on the basis of which the apparatus creates an interference relationship table 812.

LTE can efficiently be deployed in both the paired and unpaired spectrums. The basic principle of TDD is to use the same frequency band for transmission and reception. This is a fundamental difference compared to Frequency Division Duplex (FDD) where different frequencies are used for continuous UE reception and transmission. LTE TDD and FDD modes have been greatly harmonized in sense that the both modes share the same underlying framework, including radio access schemes Orthogonal Frequency Division Multiplexing Access (OFDMA) in downlink and Single Carrier Frequency Division Multiplexing Access (SC-FDMA) in uplink direction, and a concept of a subframe. The TDD mode is included together with the FDD mode in many specifications, including also physical layer specifications. The LTE harmonization has resulted in that in terms of architecture the TDD mode and the FDD mode are very similar. Another key feature of the LTE TDD mode is the commonality with Time Division Synchronous Code Division Multiple Access (TD-SCDMA). TD-SCDMA is an air interface found in UMTS mobile telecommunications networks in China as an alternative to Wideband Carrier Frequency Division Multiplexing Access (W-CDMA). Together with TD-CDMA, it is also known as UMTS-TDD or IMT 2000 Time-Division (IMT-TD). There is a global trend to reserve significant unpaired spectrum allocations and deploy those allocations in the LTE TDD mode.

As mentioned in the above, the uplink and downlink resources of the RAN are scheduled according to a time-division to the UEs. This time division may or may not be TDD. The time division means that a transmission, either in uplink direction or in downlink direction, is divided in time periods. The present invention can be utilized in LTE networks and in other types of RANs.

The exemplary embodiments described in the above may include, for example, any suitable network devices, base stations, eNodeBs, RAN devices, laptop computers, Internet appliances, handheld devices, cellular telephones, smart phones, wireless devices, and the like, capable of performing the processes of the exemplary embodiments. The devices and subsystems of the exemplary embodiments can communicate with each other using any suitable protocol and they may be implemented using one or more programmed computer systems or devices.

The present invention may be implemented in software, hardware, application logic or a combination of software, hardware and application logic. The application logic, software or instruction set is maintained on any one of various conventional computer-readable media. In the context of this document, a "computer-readable medium" may be any media or means that contain, store, communicate, propagate or transport the instructions for use by or in connection with an instruction execution system, apparatus, or device, such as a computer. A computer-readable medium may comprise a computer-readable storage medium that may be any media or means that contain or store the instructions for use by or in connection with an instruction execution system, apparatus, or device, such as a computer.

The exemplary embodiments can store information relating to various processes described herein. This information can be stored in one or more memories, such as a hard disk, optical disk, magneto-optical disk, RAM, and the like All or a portion of the exemplary embodiments can be conveniently implemented using one or more general purpose processors, microprocessors, digital signal processors, micro-controllers, and the like, programmed according to the teachings of the exemplary embodiments of the present invention, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present invention can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program of an embodiment of the present invention for performing all or a portion (if processing is distributed) of the processing performed in implementing the present invention. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like.

While the present invention has been described in connection with a number of exemplary embodiments, and implementations, the present invention is not so limited, but rather covers various modifications, and equivalent arrangements, which fall within the purview of prospective claims.

What is claimed is:

1. A method of reducing radio interferences, the method comprising the following to be performed in a radio access network:
   triggering, by circuitry, a user equipment to measure first interferences originated from a first group of user equipments;
   triggering, by the circuitry, the user equipment to measure second interferences originated from a second group of the user equipments, wherein uplink and downlink resources of the radio access network are scheduled according to a time-division, so that simultaneous transmissions are allowed only for such user equipments that belong to different groups; and
   placing, by the circuitry, the user equipment into the first group when the first interferences are higher than the second interferences.

2. An apparatus, comprising:
   circuitry configured to
   measure first interferences originated from a first group of user equipments and measure second interferences originated from a second group of the user equipments, wherein uplink and downlink resources of a radio access network are scheduled according to a time-division, so that simultaneous transmissions are allowed only for such user equipments that belong to different groups; and
   report the first interferences and the second interferences to at least one of a base station or a radio access network.

3. The apparatus according to claim 2, wherein the first interferences are measured using a first measurement pattern and the second interferences are measured using a second measurement pattern.

4. The apparatus according to claim 3, wherein the apparatus is a user equipment and the circuitry is configured to:
   read from the first measurement pattern a measurement period that at least partly overlaps with a transmission period scheduled to the first group.

5. The apparatus according to claim 4, wherein the circuitry is configured to:
   interrupt the measuring of the first interferences when the measurement period ends.

6. The apparatus according to claim 5, wherein the circuitry is configured to:
   continue the measuring during a next measurement period when the first measurement pattern includes the next measurement period.

7. The apparatus according to claim 2, wherein the reporting includes adding first measurement results describing the first interferences and adding second measurement results describing the second interferences into a measurement report to be sent to the radio access network.

8. The apparatus according to claim 2, wherein an interference included in the first interferences is measured as power of unwanted signal.

9. An apparatus, comprising:
   circuitry configured to
   trigger a user equipment to measure first interferences originated from a first group of user equipments;
   trigger the user equipment to measure second interferences originated from a second group of the user equipments, wherein uplink and downlink resources of a radio access network are scheduled according to a time-division, so that simultaneous transmissions are allowed only for such user equipments that belong to different groups; and
   place the user equipment into the first group when the first interferences are higher than the second interferences.

10. The apparatus according to claim 9, wherein the first interferences are measured using a first measurement pattern and the second interferences are measured using a second measurement pattern.

11. The apparatus according to claim 10, wherein the first measurement pattern results in at least one measuring result due to which the first interferences are higher than the second interferences.

12. The apparatus according to claim 10, wherein the circuitry is configured to:
    set into the first measurement pattern a measurement period that at least partly overlaps with a transmission period scheduled to the first group.

13. The apparatus according to claim 9, wherein the circuitry is configured to:
    make a transmission pattern for a Full-Duplex user equipment, the transmission pattern allocating a part of the uplink and downlink resources to the Full-Duplex user equipment.

14. The apparatus according to claim 13, wherein the transmission pattern discloses a time period that is intended for Full-Duplex transmission and another time period that is intended for Half-Duplex transmission in either uplink or downlink direction.

15. The apparatus according to claim 9, wherein the circuitry is configured to:
    trigger the user equipment to measure third interferences originated from the second group of user equipments.

16. The apparatus according to claim 15, wherein the circuitry is configured to:
    prevent, during at least one time period, simultaneous transmissions of two such user equipments that belong to the different groups when a measuring report is obtained as a response to the triggering and the measuring report indicates high interference.

17. The apparatus according to claim 16, wherein the circuitry is configured to:
    create an interference relationship table on the basis of the measuring report to detect interferences that exceed a predetermined threshold.

18. The apparatus according to claim 15, wherein the third interferences are at least partly caused by a Full-Duplex user equipment.

19. The apparatus according to claim 15, wherein the circuitry is configured to:
    move the user equipment from the first group into the second group when the third interferences are higher than the first interferences.

20. The apparatus according to claim 9, wherein
    the apparatus is a base station of the radio access network, and
    the circuitry is configured to place the user equipment into the first group when the user equipment is located on a coverage area of the base station.

* * * * *